United States Patent

Stark et al.

[11] Patent Number: 5,809,055
[45] Date of Patent: Sep. 15, 1998

[54] METALLURGICAL VESSEL HEATED BY DIRECT CURRENT AND HAVING A BOTTOM ELECTRODE

[75] Inventors: Heinz Stark, Essen; Heribert König, Duisburg, both of Germany

[73] Assignee: Mannesmann Aktiengesellschaft, Dusseldorf, Germany

[21] Appl. No.: 716,196

[22] PCT Filed: Mar. 29, 1995

[86] PCT No.: PCT/DE95/00452

§ 371 Date: Dec. 5, 1996

§ 102(e) Date: Dec. 5, 1996

[87] PCT Pub. No.: WO95/27084

PCT Pub. Date: Oct. 12, 1995

[30] Foreign Application Priority Data

Mar. 30, 1994 [DE] Germany ............... 44 11 591.1

[51] Int. Cl.[6] ............................................. F27D 1/00
[52] U.S. Cl. ...................................... 373/72; 373/108
[58] Field of Search ......................... 373/71, 72, 108; 110/323, 326, 338; 264/29.6, 29.7, 344, 345; 432/252

[56] References Cited

U.S. PATENT DOCUMENTS

| | | | |
|---|---|---|---|
| 1,299,110 | 4/1919 | Booth | 373/72 |
| 1,806,210 | 5/1931 | Miguet | 373/72 |
| 4,692,930 | 9/1987 | Radke et al. | 373/72 |
| 4,853,941 | 8/1989 | Rappinger et al. | 373/72 |
| 5,255,284 | 10/1993 | Meredith | 373/72 |

*Primary Examiner*—Tu B. Hoang
*Attorney, Agent, or Firm*—Cohen, Pontani, Lieberman, Pavane

[57] ABSTRACT

A metallurgical vessel heated by direct current, particularly for the production of ferroalloys, including a metallic jacket lined with refractory material and a bottom electrode. A bottom electrode (22) is located within the interior of the vessel and arranged below a refractory side wall (12) of the metallurgical vessel (10). Bottom electrode (22) is constructed from electrically conducting refractory material. The periphery of the electrically conducting bottom (22) is surrounded by metallic plates (25), each of which is connected to current rods (31) which extend through a metallic jacket (11) and out from the vessel. Plates (25) and current rods (31) are separated from the metallic jacket (11) by electrical insulation (32). The electrode device in the bottom of the vessel ensures electrical contact over as large an area as possible. In addition, reliable current transfer between the melt and the electrode device in the bottom of the vessel is ensured in the case of a power supply lead which is independent of the thermal load on the refractory lining.

16 Claims, 2 Drawing Sheets

METALLURGICAL VESSEL HEATED BY DIRECT CURRENT AND HAVING A BOTTOM ELECTRODE

BACKGROUND OF THE INVENTION

1. Field of the Invention

The present invention relates to a metallurgical vessel heated by direct current, in particular for the production of ferroalloys, including a metallic jacket lined with refractory material and a botton electrode.

2. Description of the Related Art

Vessels operated by means of direct current, such as furnaces, ladles or the like have, in addition to the electrode which projects in the form of a rod into the vessel and is generally designed as a cathode, an anode arranged in the bottom or in the region of the bottom. This contact device serves the aim of establishing a cathodic contact at the periphery of a molten metal bath in a metallurgical vessel. Metal rods passed through the bottom of the vessel or electrically conducting refractory rammed mixes or bricks are used as anodes. German patent publication DE 31 07 454 A1 discloses an electrode contact device arranged in the form of a ring or part of a ring on a common circle along the periphery of the ladle. This contact device is connected to conducting inserts, which can also occupy a relatively small portion of the bottom of the vessel.

In the case of the bottom electrode known from this publication, only part of the bottom of the vessel is designed as an electrode. Moreover, the known electrode is suitable only for relatively small vessels since no compensation is provided for the thermal expansion of the bottom, particularly in the case of relatively large vessels.

A bottom for an electrically heated melting furnace, in particular a direct current electric-arc furnace, is disclosed in German patent publication DE 35 34 750 C2. In this publication, at least the central area of an electrically heated melting furnace is provided with layers of electrically conducting material that serve as electrodes and a nonmetallic material with a high melting point is used. This publication gives no indication of how the contact between the power supply lead and the electrically conducting bottom is to be made.

SUMMARY OF THE INVENTION

An object of the present invention is to provide a bottom electrode of a metallurgical vessel which is heated by direct current and forms an electrical contact over as large an area as possible. At the same time, reliable current transfer between the melt and the electrode device in the bottom of the vessel is ensured in the case of a power supply lead which is independent of the thermal load on the refractory lining.

According to the present invention, the bottom of the metallurgical vessel, which is arranged below the refractory side wall, is constructed from electrically conducting material. Metallic plates are provided at the periphery of the bottom, and each of the plates is connected to current contacts that project from the furnace vessel. Placed next to one another, the individual plates form a contact-plate ring which is arranged parallel to the center line and which rests snugly against the outer edge of the electrically conducting bottom and is thus capable of transmitting the electric current reliably. Rod-like elements, which radiate outwards through the vessel wall and are connected to a bus line, are arranged on the plates and connected closely to them. Reliable contact with the plates, which are preferably produced from copper and have an L-shaped profile with a limb directed away from the center of the vessel, is achieved by virtue of the thermal expansion of the refractory material. The contact plates within the bottom lining are protected from corrosion by the exclusion of air.

A high effectiveness of the contact between the molten metal bath and the copper plates is achieved by the use, in the bottom, of the refractory material that conducts electric current. By arranging the entire electrode below the precipitate of the bath, contact which is very largely independent of the level of filling is achieved. Given the very different electrical conductivity of the very wide range of different metals to be produced this has a clearly positive effect in terms of process engineering. The bottom electrode is here connected as the anode, so that the flow of current assists the heat-induced flow in the bath.

In an advantageous development, one half of the plates in each case is connected to a separate line. In this way—insofar as electrical energy transfer takes place in an electric arc—uncontrollable deflection of the electric arc between the electrode projecting into the metallurgical vessel and the bath of molten metal connected to the conducting bottom is avoided.

Fine calcined magnesite brick with a carbon content of about 15% is the construction material for the bottom electrode. This material has low thermal conductivity in combination with a high electrical conductivity. It is, moreover, chemically resistant to a whole range of metals to be produced or smelted in the metallurgical vessel, in particular ferroalloys.

In addition, carbon brick in the form of large-volume slabs may also be used as the bottom electrode. Alternatively, the bottom electrode may be produced from a rammed mix, whereby the electrical conductivity may be influenced by enriching the rammed mix with embedded metallic elements. The embedded metallic elements may be arranged in the refractory rammed mix in a star shape with an increasing proportion of the metallic elements towards the periphery of the bottom electrode.

The electrode, which is produced from electrically conducting refractory material, is arranged in a protected position below the refractory side wall of the metallurgical vessel. Provided between the metal jacket and the bottom electrode is a damping and insulating compound which, for the purpose of reliably making contact, presses the metal plates against the periphery of the bottom electrode without destroying the refractory material.

The metallic parts which carry the current from the refractory bottom electrode to the current lead are electrically isolated from the metallic vessel in order to avoid an undefined flow of current via the metallic jacket of the furnace vessel.

In order to be able to accommodate, without damage, any movement between the current leads and the rods connected to the current plates, these connecting leads are designed as flexible cables.

DETAILED DESCRIPTION OF THE PRESENTLY PREFERRED EMBODIMENTS

Figure 1:
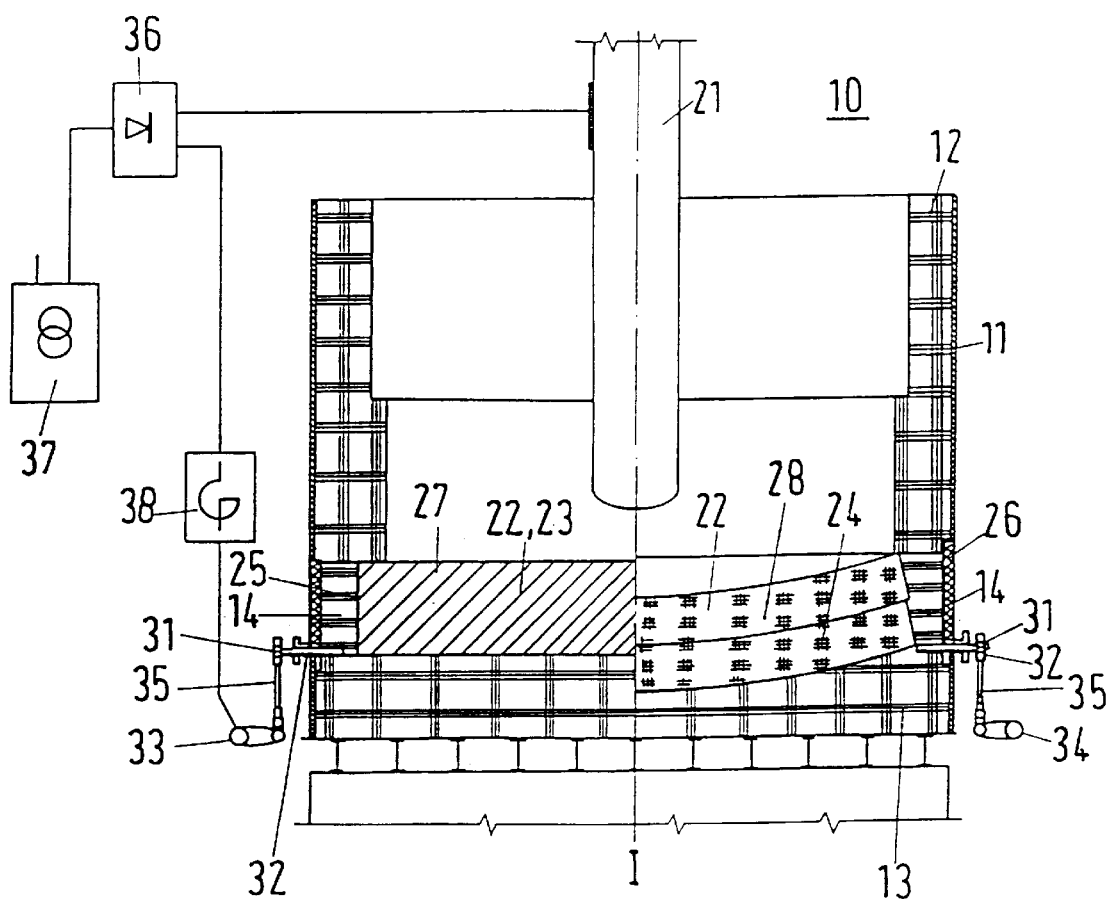
FIG. 1 shows a section through the metallurgical vessel in accordance with the present invention and FIGS. 2a and b show the electrical connection of the current-carrying elements.

FIG. 1 shows the furnace vessel 10, into which a rod-shaped electrode 21 connected as a cathode extends. The furnace vessel 10 has a metallic jacket 11 which has a refractory side wall 12 and a refractory bottom 13. The bottom electrode 22, which is manufactured from refractory material, is arranged directly underneath the refractory side wall 12. In the left-hand part of the figure, the bottom electrode 22 is manufactured from a rammed mix 23. In the present example, embedded metal elements 27 are provided in the rammed mix 23. In the right-hand side of the picture, the bottom electrode is illustrated as dish shaped and constructed from two layers 24 and 28 of bricks.

Arranged at the periphery of the bottom electrode 22 are plates 25 which are supported on the metallic jacket 11 via damping and insulating material 26. Current-carrying rods 31 leading out of the vessel 10 through the damping material 26 and the metallic jacket 11 are attached to the plates 25. The rods 31 have an insulation 32 as electrical isolation. The rods 31 are connected to a current lead 33 or 34 by flexible cables 35. The cathode 21 and the anode 22 are connected to the electric power system comprising a rectifier 36, a transformer 37 and an inductor 38.

Figure 2A:
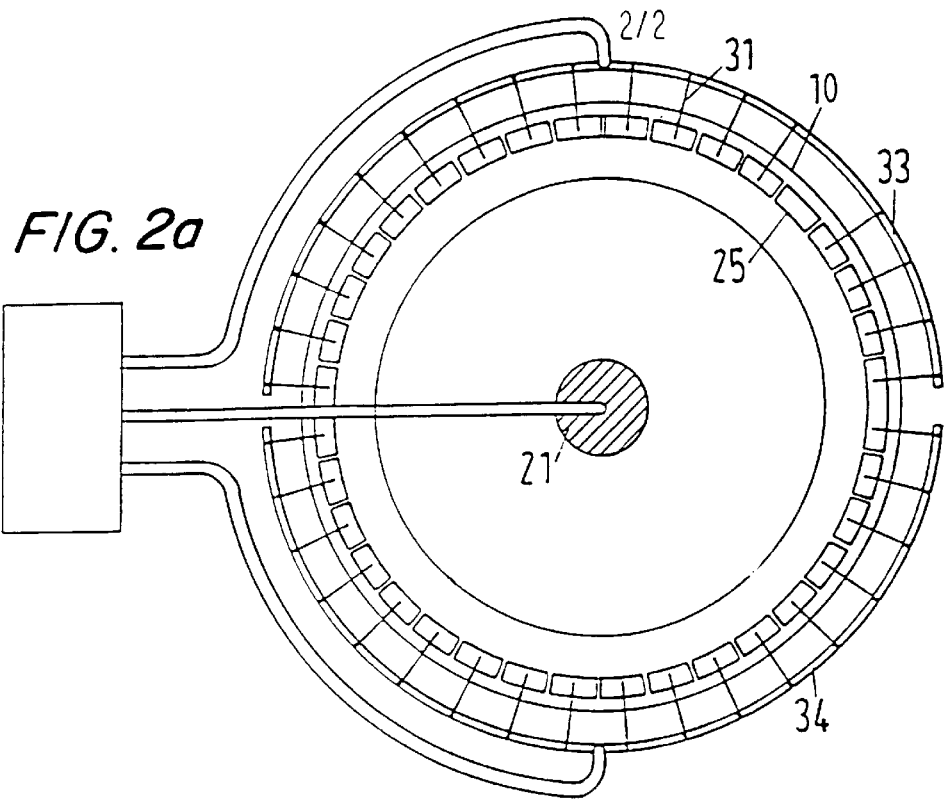
Figure 2B:
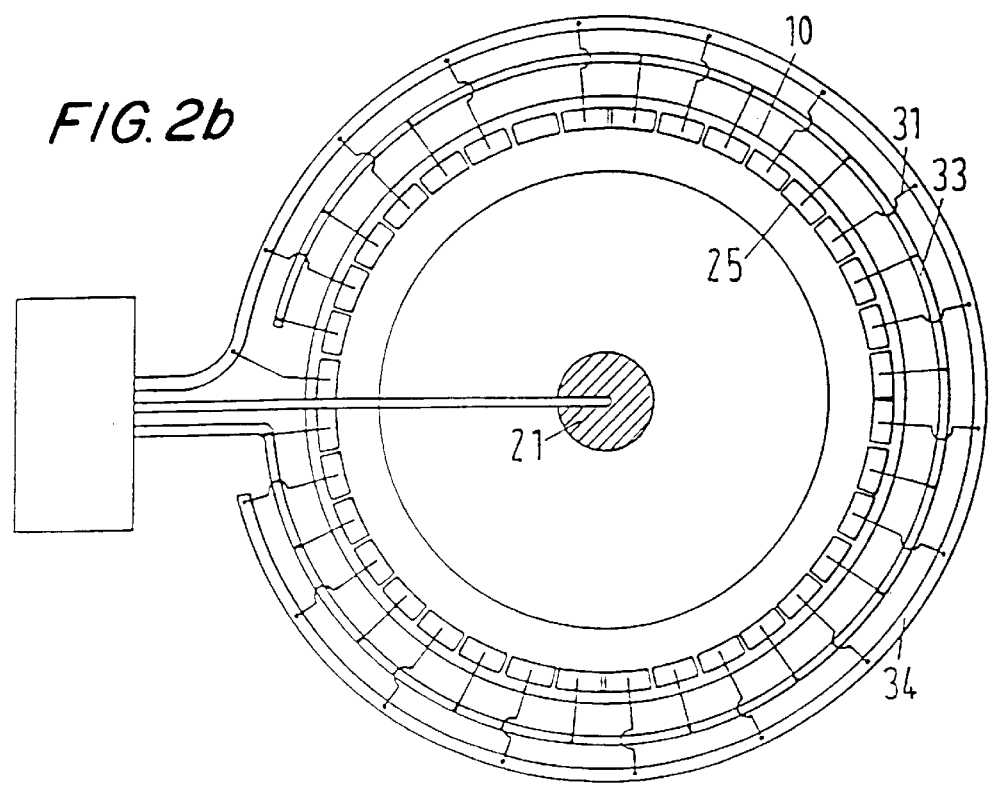

FIGS. 2a and 2b show schematically the connection of the individual plates 25, which rest against the bottom electrode 22, and of the rod electrode connected up as a cathode. In FIG. 2a, the individual plates 25 are divided in half in such a way that the adjacent plates 25 of one half of the vessel 10 are connected via the current-carrying rods 31 of the first current lead 33, and the other half is connected with the same mode of construction to current lead 34. In FIG. 2b, adjacent plates 25 are connected to current leads 33 and 34 respectively.

We claim:

1. A system including a metallurgical vessel heated by direct current, comprising:
   a metallic jacket lined with a refractory material, said metallic jacket including a refractory side wall and a refractory bottom forming said metallurgical vessel;
   a bottom electrode located within said metallurgical vessel adjacent to the refractory bottom and below the refractory side wall, wherein said bottom electrode is made of an electrically conducting refractory material;
   a plurality of metallic plates surrounding and in contact with a periphery of said bottom electrode from which air is excluded; and
   current rods extending radially outward from each of said plurality of metallic plates through said metallic jacket and out from said metallurgical vessel, wherein said plurality of plates and said current rods are separated from said metallic jacket by an electrical insulation.

2. The system in claim 1, wherein said metallic plates are made of copper and have an L-shaped profile with a limb directed away from a center of said metallurgical vessel.

3. The system in claim 1, wherein the electrically conducting refractory material is calcined magnesite bricks having a carbon content of 10% to 20%.

4. The system in claim 1, further comprising a damping and insulating material provided between said bottom electrode and said metallic jacket.

5. The system in claim 4, wherein said bottom electrode is dish shaped.

6. The system in claim 5, further comprising a refractory ring arranged between said damping and insulating material and said bottom electrode.

7. The system in claim 6, wherein said refractory ring is a seating block.

8. The system in claim 1, wherein the electrically conducting refractory material comprises a refractory rammed mix.

9. The system in claim 8, wherein the refractory rammed mix comprises embedded metallic elements.

10. The system in claim 9, wherein the embedded metallic elements are arranged in the refractory rammed mix in a star shape with an increasing proportion of the metallic elements towards the periphery of said bottom electrode.

11. The system in claim 1, further comprising a first current lead and a second current lead arranged outside of said metallurgical vessel, wherein half of said plurality of metallic plates are electrically connected to said first current lead and the other half of said plurality of metallic plates are connected to said second current lead.

12. The system in claim 11, further comprising a power supply means connected to said first and second current leads.

13. The system in claim 12, wherein said power supply means further comprises a transformer interposed between an inductor and a rectifier.

14. The system in claim 11, further comprising flexible cables connecting said current rods to said first and second current leads.

15. The system in claim 1, wherein said bottom electrode is an anode.

16. The system in claim 5, wherein said bottom electrode comprises two layers of bricks.

* * * * *